US012699517B2

(12) United States Patent
Wei

(10) Patent No.: US 12,699,517 B2
(45) Date of Patent: Aug. 4, 2026

(54) ATOMICITY ASSURANCE IN WRITE THROUGH MODE

(71) Applicant: Micron Technology, Inc., Boise, ID (US)

(72) Inventor: Meng Wei, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 19/104,166

(22) PCT Filed: Aug. 17, 2022

(86) PCT No.: PCT/CN2022/112984
§ 371 (c)(1),
(2) Date: Feb. 14, 2025

(87) PCT Pub. No.: WO2024/036505
PCT Pub. Date: Feb. 22, 2024

(65) Prior Publication Data
US 2026/0056670 A1 Feb. 26, 2026

(51) Int. Cl.
*G06F 3/06* (2006.01)
(52) U.S. Cl.
CPC .......... *G06F 3/0619* (2013.01); *G06F 3/0634* (2013.01); *G06F 3/0656* (2013.01); *G06F 3/0679* (2013.01)
(58) Field of Classification Search
CPC .... G06F 3/0619; G06F 3/0634; G06F 3/0656; G06F 3/0679
See application file for complete search history.

(56) References Cited

U.S. PATENT DOCUMENTS

| | | | |
|---|---|---|---|
| 8,806,115 B1 * | 8/2014 | Patel | .................. G06F 12/0246 |
| | | | 711/104 |
| 2009/0049320 A1 * | 2/2009 | Dawkins | ............... G06F 1/3268 |
| | | | 711/170 |

(Continued)

FOREIGN PATENT DOCUMENTS

| | | |
|---|---|---|
| CN | 105511802 A | 4/2016 |
| CN | 105630696 A | 6/2016 |

(Continued)

OTHER PUBLICATIONS

"International Application Serial No. PCT/CN2022/112984, International Search Report mailed Apr. 21, 2023", 3 pgs.

(Continued)

*Primary Examiner* — Jane W Benner
(74) *Attorney, Agent, or Firm* — Schwegman Lundberg & Woessner, P.A.

(57) ABSTRACT
A power loss protection failure is detected at a memory device. Based on detecting the power loss protection failure, a count of unused entries in a journal buffer is determined. A host command is received, and a number of entries needed to record the host command to the journal buffer is determined. In response to determining the count of unused entries in the journal buffer includes a least the number of entries needed to record the host command to the journal buffer, the host command is recorded in the journal buffer and the count of unused entries is reduced by the number of entries needed to record the host command to the journal buffer.

20 Claims, 5 Drawing Sheets

(56) References Cited

U.S. PATENT DOCUMENTS

| | | | |
|---|---|---|---|
| 2015/0370655 A1* | 12/2015 | Tucek | G06F 11/1471 |
| | | | 714/15 |
| 2019/0258418 A1* | 8/2019 | Liu | G06F 3/0679 |
| 2020/0242021 A1 | 7/2020 | Gholamipour et al. | |
| 2020/0363997 A1 | 11/2020 | Li et al. | |
| 2021/0081135 A1 | 3/2021 | Troy et al. | |
| 2022/0206713 A1 | 6/2022 | Kim et al. | |
| 2022/0413940 A1* | 12/2022 | Yeom | G06F 9/5038 |
| 2024/0004555 A1* | 1/2024 | Fukutomi | G06F 12/0238 |

FOREIGN PATENT DOCUMENTS

| | | | |
|---|---|---|---|
| CN | 114078518 A | 2/2022 | |
| EP | 2420933 A1 | 2/2012 | |
| WO | WO-2022169444 A1 | 8/2022 | |
| WO | WO-2024036505 A1 | 2/2024 | |

OTHER PUBLICATIONS

"International Application Serial No. PCT/CN2022/112984, Written Opinion mailed Apr. 21, 2023", 3 pgs.

"European Application Serial No. 22955287.2, Response filed Jun. 6, 2025 to Communication pursuant to Rules 161(2) and 162 EPC mailed Mar. 26, 2025", 8 pages.

"European Application Serial No. 22955287.2, Extended European Search Report mailed Mar. 11, 2026", 9 pages.

* cited by examiner

ATOMICITY ASSURANCE IN WRITE THROUGH MODE

PRIORITY APPLICATION

This application is a U.S. National Stage Application under 35 U.S.C. 371 from International Application No. PCT/CN2022/112984, filed 17 Aug. 2022, published as WO 2024/036505, which is incorporated herein by reference in its entirety.

TECHNICAL FIELD

Embodiments of the disclosure relate generally to memory sub-systems and more specifically to managing a journal buffer to assure memory device operation atomicity.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
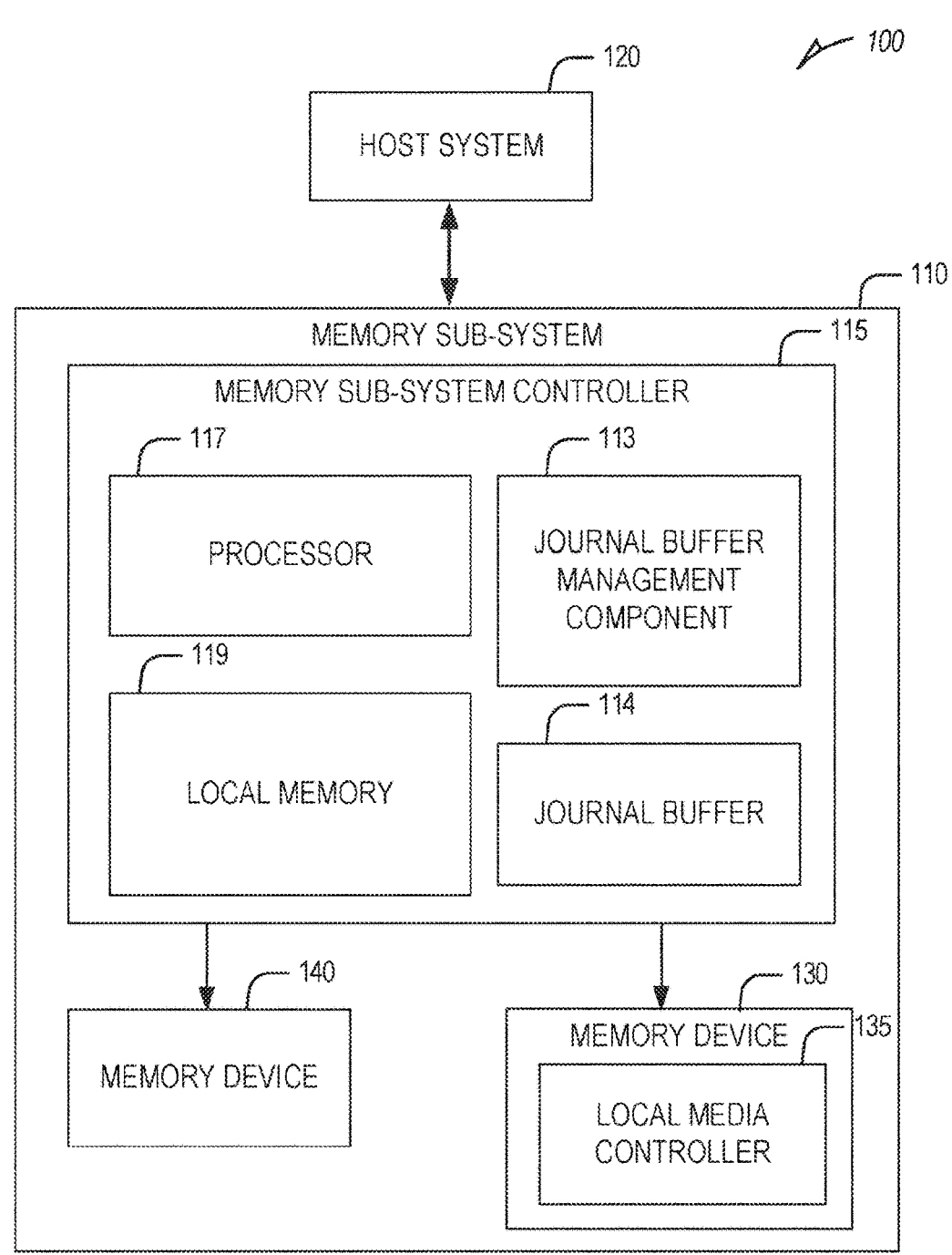
FIG. 1 is a diagram illustrating an example computing system that includes a memory sub-system, in accordance with some embodiments of the present disclosure.

Aspects of the present disclosure are directed to an approach managing a journal buffer to assure memory device operation atomicity. A memory sub-system can be a storage device (e.g., solid-state drive (SSD)), a memory module, or a combination of a storage device and memory module. Examples of other storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system. A memory sub-system controller typically receives commands or operations from the host system and converts the commands or operations into instructions or appropriate commands to achieve the desired access to the memory components of the memory sub-system.

A memory device can be a non-volatile memory device. One example of non-volatile memory devices is a negative-and (NAND) memory device. Other examples of non-volatile memory devices are described below in conjunction with FIG. 1. A NAND memory device can include multiple NAND dies. Each die may include one or more planes and each plane includes multiple blocks. Each block includes an array that includes pages (rows) and strings (columns). A string includes a plurality of memory cells connected in series. A memory cell ("cell") is an electronic circuit that stores information. Depending on the cell type, a cell can store one or more bits of binary information and has various logic states that correlate to the number of bits being stored. The logic states can be represented by binary values, such as "0" and "1," or combinations of such values.

Various memory access operations can be performed on the memory cells. Data can be written to, read from, and erased from memory cells. Memory cells can be grouped into a write unit, such as a page. For some types of memory devices, a page is the smallest write unit. A page size represents a particular number of cells of a page. For some types of memory devices (e.g., NAND), memory cells can be grouped into an erase unit, such as a block. Data can be written to a block, page-by-page. Data can be erased at a block level. However, portions of a block cannot be erased.

Within the context of a memory sub-system, a physical address identifies a physical location of data in a memory device. A logical address is a virtual address that is used by the host system as a reference to access a data unit corresponding to a physical location in the memory device. The data unit may correspond to a block, a page, or a sub-page. The memory sub-system maintains a logical to physical (L2P) table (also referred to as a "L2P mapping" or "data map") to process access requests received from the host system. The L2P table includes a mapping between physical addresses and logical addresses. The L2P table is typically stored in volatile memory and is thus lost if a power loss occurs.

A journal buffer is a data structure with a fixed number of entries that is used by the memory sub-system controller to rebuild the logical address to physical address mapping upon system power on after an abrupt power loss event. Each entry in the journal buffer is used to record a physical address at which data is written and a logical address corresponding to the physical address. One or more entries may be needed to record each command. One or more journal buffers may be maintained by a flash translation layer (FTL) of the memory sub-system controller.

Memory devices are often equipped with a power loss protection (PLP) mechanism to ensure integrity of data in the event of power loss. Typically, the PLP mechanism includes a PLP capacitor to supply power to the memory device if such a power loss occurs. The power supplied by the PLP capacitor allows the memory sub-system controller to save critical data and corresponding system management information to the memory device. However, the PLP capacitor is subject to failure, especially later in the life cycle of the memory device. If the PLP capacitor fails, the memory sub-system controller is unable to save data on the memory device when a power loss occurs.

Conventionally, if the memory sub-system controller detects a failure of the PLP capacitor, the memory sub-system controller places the memory device in read-only-mode. While in read-only-mode only read commands (and a limited set of administrative commands) can be processed at the device, but write commands are not. However, such limited functionality does not align well with common business requirements. As a result, memory sub-systems are typically configured to instead place memory devices in write through mode when a PLP failure is detected. While in write through mode, write commands may be received from the host system, but the memory sub-system controller does not return a completed status to the host system until the write data is saved to the memory device. Though the usage of write through mode is intended to be temporary (e.g., a few weeks), the memory device is kept in write through mode until the memory device is replaced.

Certain functional specifications that define required functionality for memory devices (such as the NVMe specification) include a requirement for atomicity of operations in the memory device to ensure that data from a first command is stored continuously without containing intermediate partial data from a second command. This requirement is also referred to as "atomic operation." To support atomic operation at the memory device, commands are serviced serially such that only a single unit of logical addresses is serviced at any one time. While in normal operation, this unit is defined as the Atomic Write Unit Normal (AWUN) and when the PLP capacitor is providing PLP in the event of a power loss, this unit is defined as the "Atomic Write Unit Power Fail (AWUPF).

To support atomic operation during write through mode, the memory sub-system applies the following principals: 1) ensure all data belonging to a single command is completely written to the memory device before returning a completed status to the host system; and 2) aggregate as many write commands as possible before flushing critical flash translation layer (FTL) structures such as the journal buffer to optimize write amplification. Typically, while in write through mode, write commands are aggregated to saturate the journal buffer. As a result, there is a risk of returning old data to the host system if an abrupt power loss happens before the journal buffer is flushed to the memory device.

In some situations, it is possible that a command may need to be recorded to multiple entries that span two journal buffers. If an abrupt power loss occurs after the first journal buffer is flushed but before the second journal buffer is flushed, the requirement for atomic operation will be violated. That is, after the next power up, only the portion of the journal entries from the first journal can be used to rebuild the translation table, but the translation table will not be fully updated because the journal entries from the second journal will be lost upon power loss.

Aspects of the present disclosure address the forgoing issues by utilizing an approach to managing a journal buffer that assures memory device atomicity while the memory device is in write through mode. In accordance with this approach, based on the memory device being placed in write through mode in response to detecting a PLP failure, a journal buffer management component of the memory sub-system controller initiates a journal buffer entry budget comprising a count of unused entries (unpopulated entries from among a fixed number of total entries) in a journal buffer. The journal buffer management component uses the journal buffer entry budget to determine whether to record commands to the journal buffer or first flush the journal buffer to the memory device before recording a command.

In an example, when a PLP failure is detected at the memory device, the memory device is placed in write through mode. Based on the memory device being placed in write through mode, the journal buffer management component accesses the journal buffer to determine the count of unused entries, and the journal buffer management component initiates the journal buffer entry budget using the determined count. When a command is received from the host system, the journal buffer management component determines a number of entries needed to record the command to the journal buffer. If the journal entry budget includes at least the number of entries needed to record the command, the command is recorded to the journal buffer (e.g., by populating one or more entries) and the journal buffer entry budget is reduced accordingly. If the number of journal entries needed to record the command to the journal buffer exceeds the count of unused entries indicated by the journal entry budget, the memory sub-system controller holds the command while the journal buffer is flushed to the memory device. The journal buffer entry budget is increased based on the journal buffer being flushed (e.g., to indicate all entries in the journal buffer are unused). Once the journal buffer is flushed, the command is serviced and recorded.

With this approach to managing journal buffers, entries to record write commands will not span multiple journal buffers and thus data belonging to a write command that is interrupted by abrupt power loss after PLP failure can be entirely recovered during the next power on sequence by traversing entries of a single journal buffer that has been flushed to the memory device. As a result, operation atomicity of memory devices can be maintained while in write through mode.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a SSD, a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., peripheral component interconnect express (PCIe) controller, serial advanced technology attachment (SATA) controller). The host system 120 uses the memory sub-system 110, for example, to write data to the memory sub-system 110 and read data from the memory sub-system 110.

The host system 120 can be coupled to the memory sub-system 110 via a host interface. Examples of a host interface include, but are not limited to, a SATA interface, a PCIe interface, USB interface, Fibre Channel, Serial Attached SCSI (SAS), Small Computer System Interface (SCSI), a double data rate (DDR) memory bus, a DIMM interface (e.g., DIMM socket interface that supports Double Data Rate (DDR)), Open NAND Flash Interface (ONFI), Double Data Rate (DDR), Low Power Double Data Rate (LPDDR), or any other interface. The host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include NAND type flash memory and write-in-place memory, such as a three-dimensional cross-point (3D cross-point) memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and 3D NAND.

Each of the memory devices 130 can include one or more arrays of memory cells. One type of memory cell, for example, single level cells (SLC), can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks. For example, the memory device can include a set of blocks. Design specifications may define a constraint on a minimum number of valid blocks for the memory device 130 that may be different from the number of blocks in the set of blocks on the device.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), NOR flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and the like. The local memory 119 can also include ROM for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 and/or the memory device 140 and convert responses associated with the memory devices 130 and/or the memory device 140 into information for the host system 120.

In some embodiments, the memory devices 130 include local media controllers 135 that operate in conjunction with memory sub-system controller 115 to execute operations on one or more memory cells of the memory devices 130.

The memory sub-system 110 also includes a journal buffer management component 113 that is responsible for managing a journal buffer 114 in a manner that assures memory device operation atomicity. The journal buffer is used to record host commands processed by the memory sub-system 110. As such, the journal buffer 114 includes a fixed number of entries for recording commands. A populated entry in the journal buffer 114 comprises a logical address and an associated physical address corresponding to a location in one of the memory devices 130 or 140 at which data is written.

The journal buffer management component 113 maintains a journal buffer entry budget comprising a count of available (unpopulated) entries from among the fixed number of total entries in the journal buffer 114. When a memory device is placed in write through mode (e.g., based on a PLP failure), the journal buffer management component 113 uses the journal buffer entry budget to determine whether to record commands to the journal buffer 114 or flush the journal buffer 114 before recording a command.

In an example, when a PLP failure is detected at the memory devices 130, the memory device 130 is placed in write through mode. While in write through mode, write commands may be received from the host system 120, but the memory sub-system 110 does not return a completed status to the host system 120 until the write data is completely saved to the memory device 130. Based on the memory device 130 being placed in write through mode, the journal buffer management component 113 accesses the journal buffer 114 to determine the count of unused entries and the journal buffer management component 113 initiates the journal buffer entry budget using the determined count. When a command is received from the host system 120, the journal buffer management component 113 determines a number of entries needed to record the command to the journal buffer 114. If the journal entry budget includes at least the number of entries to record the command, the command is recorded to the journal buffer (e.g., by populating one or more entries) and the journal entry budget is reduced accordingly. If the number of journal entries needed to record the command to the journal buffer exceeds the count of unused entries indicated by the journal entry budget, the memory sub-system 110 holds the command while the journal buffer 114 is flushed to the memory device 130. The journal buffer entry budget is increased based on the journal buffer 114 being flushed (e.g., to indicate all entries in the journal buffer 114 are unused). Once the journal buffer 114 is flushed, the command is serviced and recorded. Further details regarding the functionality of the journal buffer management component 113 are discussed below.

In some embodiments, the memory sub-system controller 115 includes at least a portion of the data journal buffer. For example, the memory sub-system controller 115 can include a processor 117 (processing device) configured to execute instructions stored in local memory 119 for performing the operations described herein. In some embodiments, the journal buffer management component 113 is part of the host system 120, an application, or an operating system. In some embodiments, the local media controller 135 includes at least a portion of the journal buffer management component 113.

Figure 2:
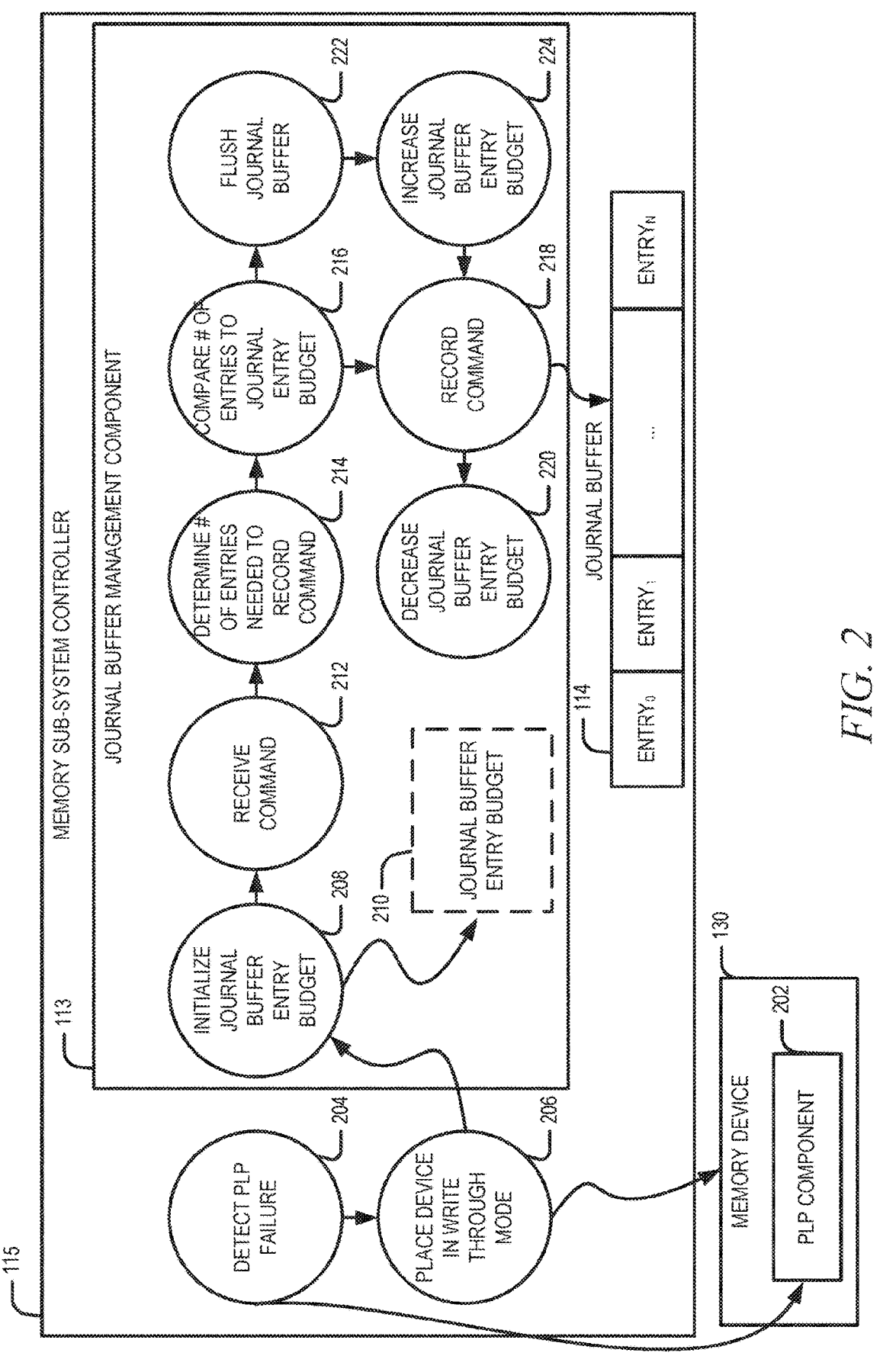
FIG. 2 is a diagram illustrating example interactions between components of a memory sub-system in managing a journal buffer to assure memory device operation atomicity, in accordance with some embodiments of the present disclosure.

FIG. 2 is a conceptual diagram illustrating example interactions between components of a memory sub-system in managing a journal buffer, in accordance with some embodiments of the present disclosure. In the example illustrated in FIG. 2, the memory device 130 is in the example form of a NAND memory device. In this example, the memory device 130 includes multiple NAND dies, each die may include one or more planes, each of which includes multiple blocks. Each block includes 2D array that includes pages (rows) and strings (columns). A string includes a plurality of memory cells connected in series. Each memory cell is used to represent one or more bit values.

In this example, the memory device 130 includes a power loss protection (PLP) component 202 to ensure integrity of data in the event of power loss at the memory device 130. The PLP component 202 can comprise one or more PLP capacitors to supply power to the memory device 130 if such a power loss occurs. The memory sub-system controller 115 monitors operation of the PLP component 202, and upon detecting a PLP failure (at operation 204) such as a failure of a PLP capacitor, the memory sub-system controller 115 places the memory device 130 in write through mode (operation 206). While in write through mode, write commands may be received from the host system 120 of FIG. 1, but the memory sub-system 110 of FIG. 1 does not return a completed status to the host system 120 until the write data is completely saved to the memory device 130.

Based on the memory device 130 being placed in write through mode, the journal buffer management component 113 initializes a journal entry budget 210 in local memory 119 (operation 208) of FIG. 1. The journal entry budget 210 comprises a count of unused entries in a journal buffer 114. The journal buffer 114 comprises a fixed number of total entries (Entry$_0$-Entry$_N$) and one or more of the entries may be used to record one or more host commands directed at the memory device 130 that have been processed by the memory sub-system 110. When an entry in the journal buffer 114 is populated (used), the entry comprises a physical address at which write data is write and a logical address (used by the host system 120) corresponding to the physical address. Entries in the journal buffer 114 that are unused and available are considered unused entries and thus included in the count of unused entries.

While in write through mode, a command to write data to the memory device 130 is received from the host system 120 (operation 212) of FIG. 1. The command includes the write data and specifies one or more logical addresses. The journal buffer management component 113 determines a number of entries in the journal buffer 114 that are needed to record the command (operation 214). As an example, the journal buffer management component 113 can determine the number of entries based on a number of logical addresses specified by the command.

At operation 216, the journal buffer management component 113 compares the number of entries that are needed to record the command in the journal buffer 114 with the journal entry budget 210 to determine whether there are enough entries in the journal buffer 114 to record the command. That is, the journal buffer management component 113 determines whether the count of unused entries in the journal buffer 114 is equal to or greater than the number of entries needed to record the command.

If the journal entry budget 210 includes at least the number of entries needed to record the command, the journal buffer management component 113 records the command in the journal buffer 114 (operation 218) and decreases journal entry budget 210 accordingly (operation 220). That is, the journal buffer management component 113 populates entries in the journal buffer 114 with one or more logical addresses along a physical address corresponding to each logical address and subtracts the number of entries used to record the command from the count of available entries in the journal entry budget 210.

If the number of entries needed to record the command exceeds the count of unused entries in the journal buffer 114, indicated by the journal entry budget 210, the journal buffer management component 113 flushes the journal buffer 114 to the memory device 130 (operation 222) while the memory sub-system controller 115 holds the command until there is enough room in the journal buffer 114. In flushing the journal buffer to the memory device 130, the journal buffer management component 113 copies populated entries to a table stored by the memory device 130 and removes the populated entries from the journal buffer 114. Based on flushing the journal buffer 114, the journal buffer management component 113 updates the journal entry budget 210 to reflect that the journal buffer 114 has been flushed (operation 224). That is, the journal buffer management component 113 increases the count of unused entries in the journal entry budget 210 by the number of entries that were flushed to the memory device 130.

For some embodiments, a flash translation layer of the memory sub-system controller 115 handles flushing the journal buffer 114 to the memory device 130, and for these embodiments, the journal buffer management component 113 instructs the flash translation layer to flush the journal buffer 114 in response to determining the number of entries needed to record the command exceeds the count of unused entries in the journal buffer 114. The flash translation layer flushes the journal buffer 114 in response to the instruction and instructs the journal buffer management component 113 to increase the journal entry budget 210 accordingly.

Figure 3:
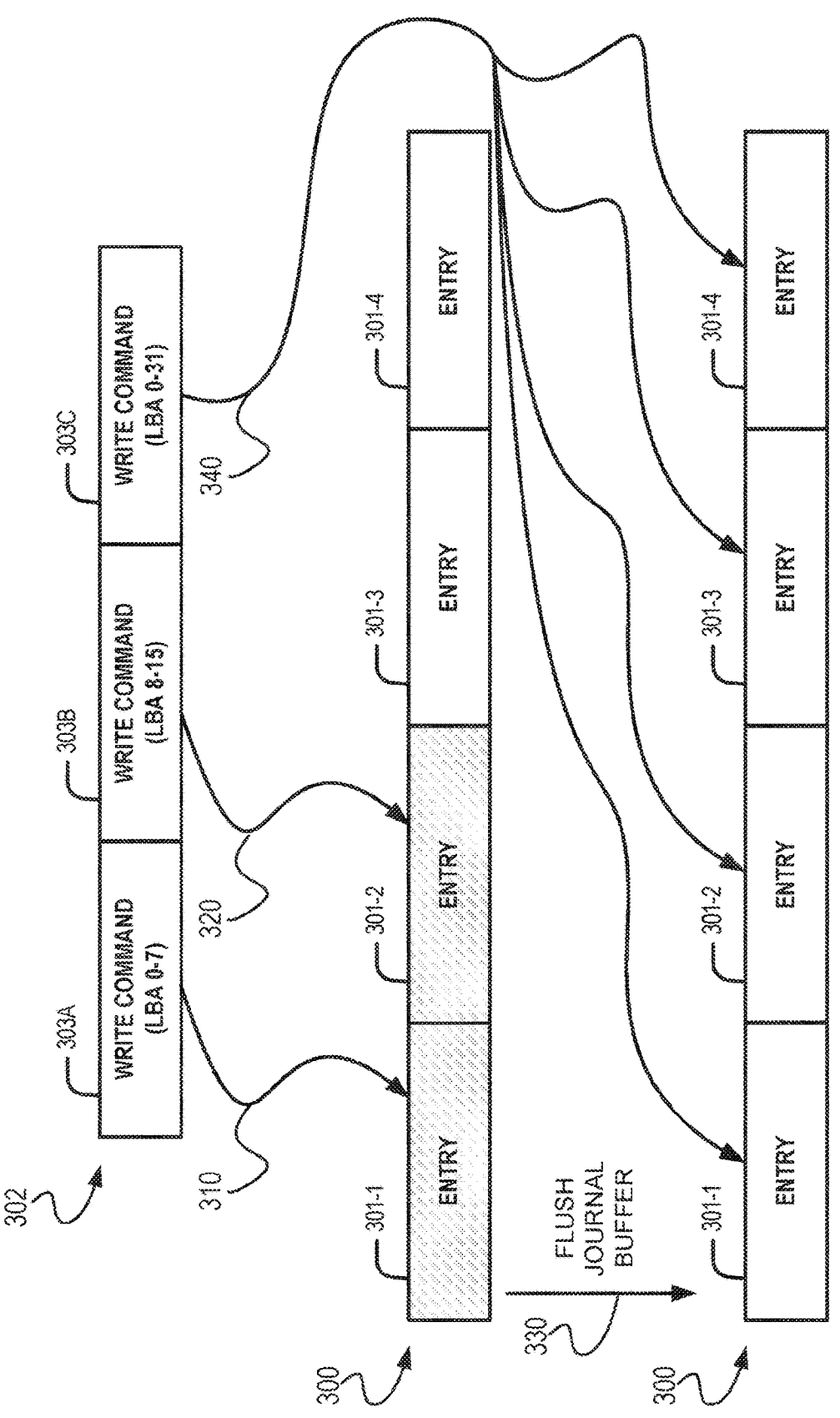
FIG. 3 is a diagram illustrating an example method for managing a journal buffer to assure memory device operation atomicity, in accordance with some embodiments of the present disclosure.

FIG. 3 is a diagram illustrating an example process for managing a journal buffer 300 maintained by the memory sub-system 110 of FIG. 1. The journal buffer 300 is an example of the journal buffer 114 of FIG. 1. As context for the example process illustrated by FIG. 3, the memory device 130 of FIG. 1 is in write through mode based on a PLP failure being detected at the memory device 130.

A host command sequence 302 is shown. The host command sequence 302 comprises a sequence of write commands received from the host system 120 of FIG. 1. In particular, the host command sequence comprises write command 303A, 303B, and 303C. As shown, write command 303A is directed at logical block addresses (LBAs) 0-6; write command 303B is directed at LBAs 8-15; and write command 303C is directed at LBAs 0-31.

In this example, the journal buffer 300 comprises 4 entries-entries 301-1, 301-2, 301-3, and 301-4. Recording write command 303A requires a single entry in the journal buffer 300 based on the number of LBAs to which the command 303A is directed and as shown, the write command 303A is recorded in entry 301-1 (at 310). Similarly, recording write command 303B requires a single entry in the journal buffer 300 and as shown, the write command 303B is recorded in entry 301-2 (at 320).

Given the number of LBAs to which the command 303C is directed, 4 entries in the journal buffer are required to record the command 303C. However, the journal buffer includes only 2 unused entries—entries 301-3 and 301-4—after recording the commands 303A and 303B, which is less than what is required for recording the command 303C. Rather than utilizing additional entries from a second journal buffer to record the command 303C, the journal buffer management component 113 of FIG. 1 flushes the journal buffer 300 to the memory device 130 (at 330) before recording the command 303C.

As a result of flushing the recorded entries for commands 303A and 303B, each of the journal buffer 300 entries 301-1, 301-2, 301-3, and 301-4 are unused and available for recording the command 303C. As such, the journal buffer management component 113 records the command 303C to the journal buffer 300 by populating the entries 301-1, 301-2, 301-3, and 301-4 with the logical addresses associated with the command 303C along with corresponding physical addresses (at 340).

Figure 4:
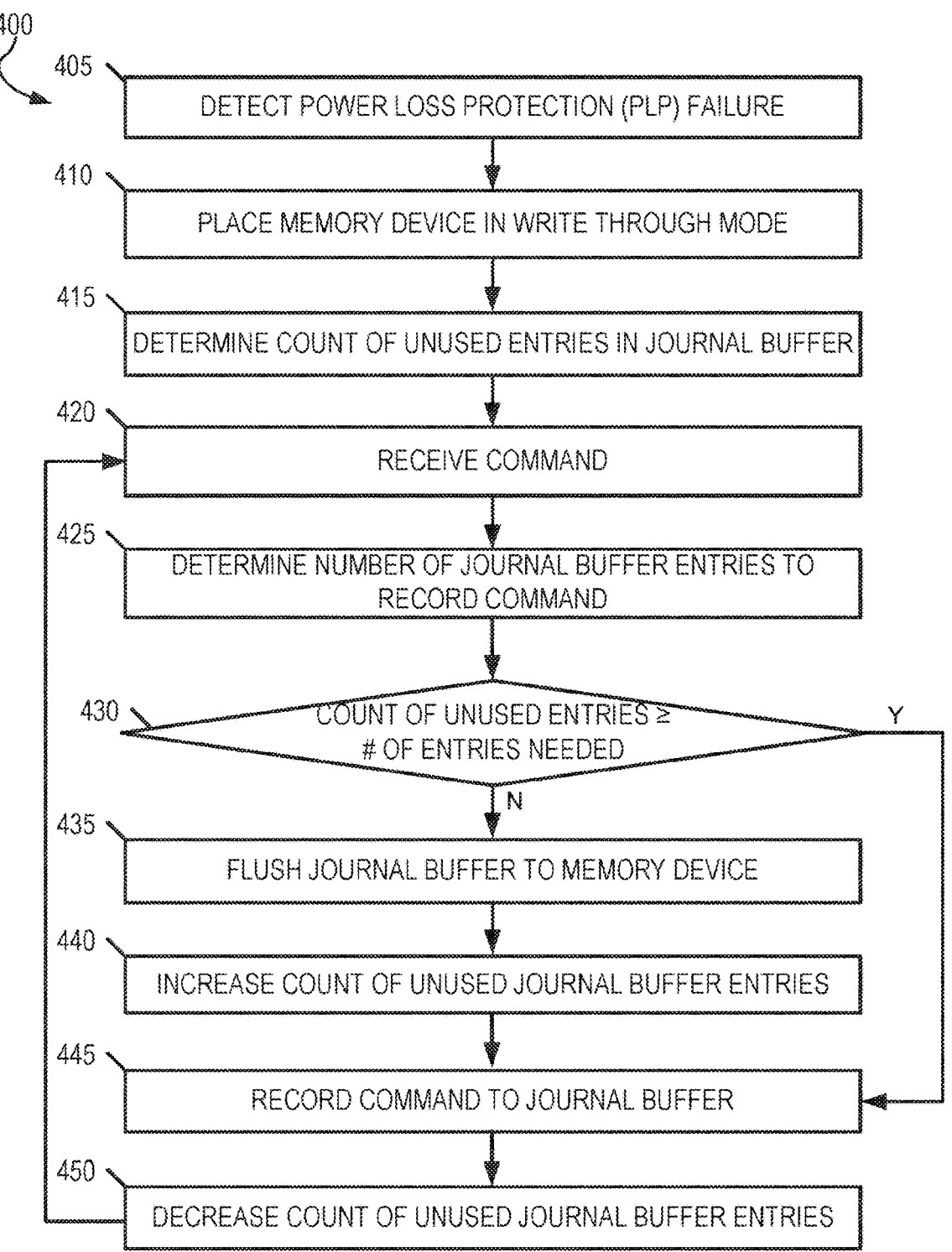
FIG. 4 are flowchart illustrating an example method for managing a journal buffer to assure memory device operation atomicity, in accordance with some embodiments of the present disclosure.

FIG. 4 is a flow diagram illustrating an example method 400 for managing a journal buffer in a memory device (e.g., memory device 130) to assure atomicity, in accordance with some embodiments of the present disclosure. The method 400 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 400 is performed by the journal buffer management component 113 of FIG. 1. Although processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

The method 400 begins at operation 405, where the processing device detects a PLP failure within the memory sub-system (e.g., the memory sub-system 110). The processing device can detect the PLP failure based on a failure of a PLP capacitor.

At operation 410, the processing device places the memory device in write through mode in response to detecting the PLP failure. While in write through mode, a host system (e.g., host system 120) can send commands to the memory sub-systems to write data to the memory device, but the memory sub-system does not return a completed status to the host system until the write data is saved to the memory device. The memory device remains in write through mode until the memory device is replaced.

In response to the memory device being placed in write through mode, the processing device determines a count of unused (available) entries in a journal buffer (e.g., the journal buffer 114), at operation 415. The processing device may maintain a journal entry budget in local memory (e.g., local memory 119) to track the count of unused entries. That is, the journal entry budget comprises the count of unused entries in the journal buffer. For some embodiments, in determining the count of unused entries in the journal buffer the processing device may access the journal entry budget. For some embodiments, the processing device may instantiate the journal entry budget upon the memory device being placed in write through mode, and in doing so, the processing device may access the journal buffer to determine the count of unused entries in the journal buffer. For some embodiments, the processing device includes a front-end component that maintains the journal entry budget.

While in write through mode, the processing device receives a command to write data to the memory device, at operation 420. The command includes write data and specifies one or more logical addresses corresponding to a location within the memory device at which the write data is to be written.

The processing device determines, at operation 425, a number of entries needed to record the command to the journal buffer. The processing device may determine the number of entries needed to record the command to the journal buffer based on a number of logical addresses specified in the command. For example, each entry in the journal buffer may be capable of recording a fixed number of logical addresses and corresponding physical addresses, and thus the processing device can determine the number of entries needed to record a given command, based on a combination of the number of logical addresses, specified by the command and the number of logical addresses an individual journal buffer entry is capable of recording.

At operation 430, the processing device determines whether the count of unused entries in the journal buffer includes the number of journal entries needed to record the command to the journal buffer. If the number of journal entries needed to record the command to the journal buffer exceeds the count of unused entries in the journal buffer, the processing device flushes the journal buffer (operation 435) to the memory device and increases the count of unused entries in the journal buffer (operation 440) based on the journal buffer being flushed. In flushing the journal buffer, the processing device writes the entries from the journal buffer to the memory device. Flushing the journal buffer renders all entries in the journal buffer available for use. Hence, upon flushing the journal buffer, the count of unused entries in the journal buffer is updated to reflect that all entries in the journal buffer are available.

Based on the increased count of unused journal buffer entries, or, if the count of unused entries in the journal buffer includes at least the number of journal entries needed to record the command to the journal buffer, the processing device records the command to the journal buffer (at operation 445) and decreases the count of unused entries in the journal buffer based on the number of entries needed to record the command to the journal buffer (at operation 450). That is, the processing device generates the number of entries in the journal buffer corresponding to the command and subtracts the number of entries from the count of unused entries. For embodiments in which the processing device includes a front-end component to maintain a journal entry budget, the front-end component decreases the journal entry budget based on the number of entries in the journal buffer used to record the command.

For some embodiments, the processing device includes the front-end component, as discussed above, and a flash translation layer that maintains the journal buffer. For these embodiments, to flush the journal buffer, the front-end component provides one or more instructions to the flash translation layer to flush the journal buffer. In response, the flash translation layer flushes the journal buffer to the memory device and based on the journal buffer being flushed, the flash translation layer instructs the front-end component to increase the journal entry budget to reflect that all entries in the journal buffer are available.

As shown, the processing device continues to service incoming host commands in the manner described above while the memory device remains in write through mode. That is, the method 400 can return to operation 420 subsequent to decreasing the count of unused journal buffer entries at operation 450, and repeat the subsequent operations of the method 400 as described above for each additional command received from the host system while the memory device remains in write through mode.

In view of the disclosure above, various examples are set forth below. It should be noted that one or more features of an example, taken in isolation or combination, should be considered within the disclosure of this application.

Example 1. A memory sub-system comprising: a memory device; and a processing device, operatively coupled with the memory device, configured to perform operations comprising: detecting a power loss protection failure at the memory device; based on detecting the power loss protection failure, determining a count of unused entries in a journal buffer; receiving a host command; determining a number of entries needed to record the host command to the journal buffer; determining the count of unused entries in the journal buffer includes a least the number of entries needed to record the host command to the journal buffer; and in response to determining the count of unused entries in the journal buffer includes a least the number of entries needed to record the host command to the journal buffer, recording the host command in the journal buffer; and decreasing the count of unused entries based on the recording of the host command to the journal buffer.

Example 2. The memory sub-system of Example 1, wherein determining the count of unused entries in the journal buffer comprises accessing the journal buffer to determine the count of unused entries, wherein the operations further comprise initiating a journal buffer entry budget based on the count of unused entries.

Example 3. The memory sub-system of any one or more of Examples 1 or 2, wherein determining a count of unused entries in the journal buffer comprises accessing a journal entry budget stored in local memory, the journal entry budget comprising the count of unused entries in the journal buffer.

Example 4. The memory sub-system of any one or more of Examples 1-3, wherein decreasing the count of unused entries comprises decreasing the journal entry budget by the number of entries needed to record the host command.

Example 5. The memory sub-system of any one or more of Examples 1-4, wherein: the host command is a first host command; the operations further comprise: receiving a second host command; determining a number of entries needed to record the second host command to the journal buffer; determining the number of entries needed to record the second host command to the journal buffer exceeds the count of unused entries in the journal buffer: based on the determining of the number of entries needed to record the second host command to the journal buffer exceeds the count of unused entries in the journal buffer, flushing the journal buffer to the memory device; and increasing the count of unused entries in the journal buffer in response to the flushing of the journal buffer.

Example 6. The memory sub-system of any one or more of Examples 1-5, wherein the operations further comprise recording the second host command to the journal buffer based on the increasing of the count of unused entries in the journal buffer based on the flushing of the journal buffer.

Example 7. The memory sub-system of any one or more of Examples 1-6, wherein the flushing of the journal buffer to the memory device comprises: instructing a flash translation layer to flush the journal buffer to the memory device; and increasing the count based on the flushing of the journal buffer comprises receiving an indication from the flash translation layer to increase a journal entry budget, the journal entry budget comprising the count of unused entries in the journal buffer.

Example 8. The memory sub-system of any one or more of Examples 1-7, wherein determining a number of entries needed to record the host command to the journal buffer comprises determining a number of logical addresses specified by the host command.

Example 9. The memory sub-system of any one or more of Examples 1-8, wherein the operations further comprise: placing the memory device in write through mode in response to detecting the power loss protection failure, wherein the host command is received while the memory sub-system is in write through mode.

Example 10. The memory sub-system of any one or more of Examples 1-9, further comprising: a power loss protection capacitor, wherein detecting the power loss protection failure comprises detecting failure of the power loss protection capacitor.

Example 11. A method comprising: detecting a power loss protection failure at a memory device; based on detecting the power loss protection failure, determining a count of unused entries in a journal buffer; receiving a host command: determining a number of entries needed to record the host command to the journal buffer; determining the count of unused entries in the journal buffer includes a least number of entries needed to record the host command to the journal buffer; in response to determining the count of unused entries in the journal buffer includes a least the number of entries needed to record the host command to the journal buffer, recording the host command in the journal buffer; and decreasing the count of unused entries by the number of entries needed to record the host command to the journal buffer.

Example 12. The method of Example 11, wherein determining the count of unused entries in the journal buffer comprises accessing the journal buffer to determine the count of unused entries, wherein the method further comprises: initiating a journal buffer entry budget based on the count of unused entries.

Example 13. The method of any one or more of Examples 11 or 12, wherein determining a count of unused entries in the journal buffer comprises accessing a journal entry budget stored in local memory, the journal entry budget comprising the count of unused entries in the journal buffer.

Example 14. The method of any one or more of Examples 11-13, wherein decreasing the count of unused entries comprises decreasing the journal entry budget by the number of entries needed to record the host command.

Example 15. The method of any one or more of Examples 11-14, wherein: the host command is a first host command; the method further comprises: receiving a second host command; determining a number of entries needed to record the second host command to the journal buffer; determining the number of entries needed to record the second host command to the journal buffer exceeds the count of unused entries in the journal buffer; based on determining the number of entries needed to record the second host command to the journal buffer exceeds the count of unused entries in the journal buffer, flushing the journal buffer to the memory device; and increasing the count of unused entries in the journal buffer in response to the flushing of the journal buffer.

Example 16. The method of any one or more of Examples 11-15, further comprising recording the second host command to the journal buffer based on the increasing of the count of unused entries in the journal buffer based on the flushing of the journal buffer.

Example 17. The method of any one or more of Examples 11-16, wherein: the flushing of the journal buffer to the memory device comprises instructing a flash translation layer to flush the journal buffer to the memory device; and increasing the count based on the flushing of the journal buffer comprises receiving an indication from the flash translation layer to increase a journal entry budget, the journal entry budget comprising the count of unused entries in the journal buffer.

Example 18. The method of any one or more of Examples 11-17, wherein determining the number of entries needed to record the host command to the journal buffer comprises determining a number of logical addresses specified by the host command.

Example 19. The method of any one or more of Examples 11-18, further comprising: placing the memory device in write through mode in response to detecting the power loss protection failure, wherein the host command is received while the memory device is in write through mode.

Example 20. A non-transitory computer-readable storage medium comprising instructions that, when executed by a processing device, configure the processing device to perform operations comprising: detecting a power loss protection failure at a memory device: based on detecting the power loss protection failure, determining a count of unused entries in a journal buffer; receiving a host command; determining a number of entries needed to record the host command to the journal buffer; determining the count of unused entries in the journal buffer includes a least the number of entries needed to record the host command to the journal buffer; and in response to determining the count of unused entries in the journal buffer includes at least the number of entries needed to record the host command to the journal buffer, recording the host command in the journal buffer; and decreasing the count of unused entries by the number of entries needed to record the host command to the journal buffer.

Figure 5:
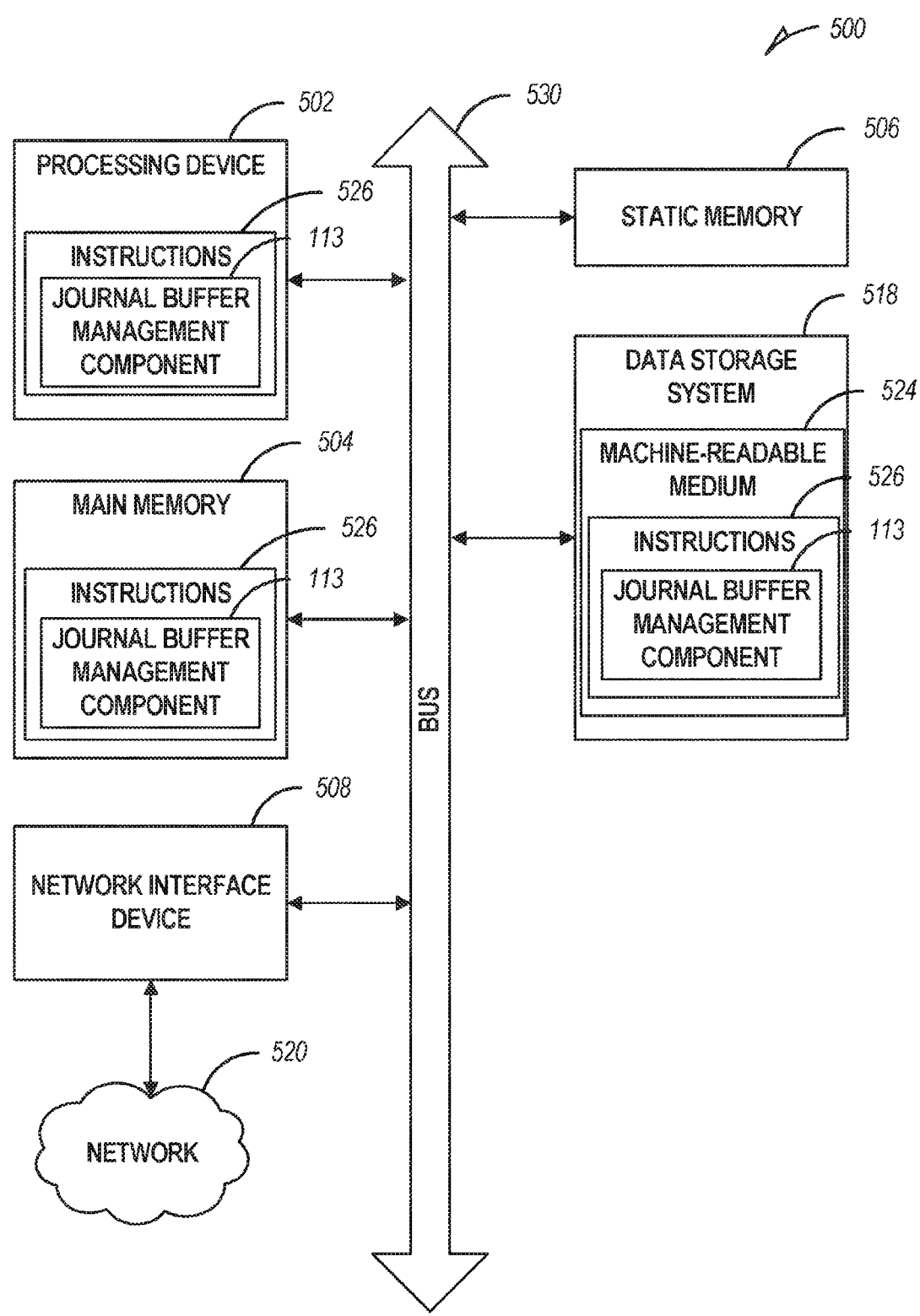
FIG. 5 is a diagram of an example computer system in which embodiments of the present disclosure may operate.

FIG. 5 illustrates an example machine in the form of a computer system 500 within which a set of instructions can be executed for causing the machine to perform any one or more of the methodologies discussed herein. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the journal buffer management component 113 of FIG. 1). In alternative embodiments, the machine can be connected (e.g., networked) to other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., ROM, flash memory, DRAM such as SDRAM or RDRAM, etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an ASIC, a FPGA, a digital signal processor (DSP), network processor, or the like. The processing device 502 is configured to execute instructions 526 for performing the operations and steps discussed herein. The computer system 500 can further include a network interface device 508 to communicate over a network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a data destruction component (e.g., the journal buffer management component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory components, and so forth.

In the foregoing specification, embodiments of the disclosure have been described with reference to specific example embodiments thereof. It will be evident that various modifications can be made thereto without departing from the broader scope of embodiments of the disclosure as set forth in the following claims. The specification and drawings are, accordingly, to be regarded in an illustrative sense rather than a restrictive sense.

What is claimed is:

1. A memory sub-system comprising:
   a memory device; and
   a processing device, operatively coupled with the memory device, configured to perform operations comprising:

detecting a power loss protection failure at the memory device;

based on detecting the power loss protection failure, determining a count of unused entries in a journal buffer;

receiving a host command;

determining a number of entries needed to record the host command to the journal buffer;

determining the count of unused entries in the journal buffer includes at least the number of entries needed to record the host command to the journal buffer;

in response to determining the count of unused entries in the journal buffer includes at least the number of entries needed to record the host command to the journal buffer, recording the host command in the journal buffer; and decreasing the count of unused entries based on the recording of the host command to the journal buffer.

2. The memory sub-system of claim 1, wherein determining the count of unused entries in the journal buffer comprises accessing the journal buffer to determine the count of unused entries, wherein the operations further comprise initiating a journal buffer entry budget based on the count of unused entries.

3. The memory sub-system of claim 1, wherein determining a count of unused entries in the journal buffer comprises accessing a journal entry budget stored in local memory, the journal entry budget comprising the count of unused entries in the journal buffer.

4. The memory sub-system of claim 3, wherein decreasing the count of unused entries comprises decreasing the journal entry budget by the number of entries needed to record the host command.

5. The memory sub-system of claim 1, wherein:

the host command is a first host command;

the operations further comprise:

receiving a second host command;

determining a number of entries needed to record the second host command to the journal buffer;

determining the number of entries needed to record the second host command to the journal buffer exceeds the count of unused entries in the journal buffer;

based on the determining of the number of entries needed to record the second host command to the journal buffer exceeds the count of unused entries in the journal buffer, flushing the journal buffer to the memory device; and increasing the count of unused entries in the journal buffer in response to the flushing of the journal buffer.

6. The memory sub-system of claim 5, wherein the operations further comprise recording the second host command to the journal buffer based on the increasing of the count of unused entries in the journal buffer based on the flushing of the journal buffer.

7. The memory sub-system of claim 5, wherein the flushing of the journal buffer to the memory device comprises:

instructing a flash translation layer to flush the journal buffer to the memory device; and increasing the count based on the flushing of the journal buffer comprises receiving an indication from the flash translation layer to increase a journal entry budget, the journal entry budget comprising the count of unused entries in the journal buffer.

8. The memory sub-system of claim 1, wherein determining a number of entries needed to record the host command to the journal buffer comprises determining a number of logical addresses specified by the host command.

9. The memory sub-system of claim 1, wherein the operations further comprise:

placing the memory device in write through mode in response to detecting the power loss protection failure, wherein the host command is received while the memory sub-system is in write through mode.

10. The memory sub-system of claim 1, further comprising:

a power loss protection capacitor, wherein detecting the power loss protection failure comprises detecting failure of the power loss protection capacitor.

11. A method comprising:

detecting a power loss protection failure at a memory device;

based on detecting the power loss protection failure, determining a count of unused entries in a journal buffer;

receiving a host command; determining a number of entries needed to record the host command to the journal buffer;

determining the count of unused entries in the journal buffer includes at least number of entries needed to record the host command to the journal buffer;

in response to determining the count of unused entries in the journal buffer includes at least the number of entries needed to record the host command to the journal buffer, recording the host command in the journal buffer; and decreasing the count of unused entries by the number of entries needed to record the host command to the journal buffer.

12. The method of claim 11, wherein determining the count of unused entries in the journal buffer comprises accessing the journal buffer to determine the count of unused entries, wherein the method further comprises:

initiating a journal buffer entry budget based on the count of unused entries.

13. The method of claim 11, wherein determining a count of unused entries in the journal buffer comprises accessing a journal entry budget stored in local memory, the journal entry budget comprising the count of unused entries in the journal buffer.

14. The method of claim 13, wherein decreasing the count of unused entries comprises decreasing the journal entry budget by the number of entries needed to record the host command.

15. The method of claim 11, wherein:

the host command is a first host command;

the method further comprises:

receiving a second host command;

determining a number of entries needed to record the second host command to the journal buffer;

determining the number of entries needed to record the second host command to the journal buffer exceeds the count of unused entries in the journal buffer;

based on determining the number of entries needed to record the second host command to the journal buffer exceeds the count of unused entries in the journal buffer, flushing the journal buffer to the memory device; and increasing the count of unused entries in the journal buffer in response to the flushing of the journal buffer.

16. The method of claim 15, further comprising recording the second host command to the journal buffer based on the increasing of the count of unused entries in the journal buffer based on the flushing of the journal buffer.

17. The method of claim 15, wherein:

the flushing of the journal buffer to the memory device comprises instructing a flash translation layer to flush the journal buffer to the memory device; and increasing the count based on the flushing of the journal buffer comprises receiving an indication from the flash translation layer to increase a journal entry budget, the journal entry budget comprising the count of unused entries in the journal buffer.

18. The method of claim 11, wherein determining the number of entries needed to record the host command to the journal buffer comprises determining a number of logical addresses specified by the host command.

19. The method of claim 11, further comprising:

placing the memory device in write through mode in response to detecting the power loss protection failure, wherein the host command is received while the memory device is in write through mode.

20. A non-transitory computer-readable storage medium comprising instructions that, when executed by a processing device, configure the processing device to perform operations comprising:

detecting a power loss protection failure at a memory device;

based on detecting the power loss protection failure, determining a count of unused entries in a journal buffer;

receiving a host command;

determining a number of entries needed to record the host command to the journal buffer;

determining the count of unused entries in the journal buffer includes at least the number of entries needed to record the host command to the journal buffer;

in response to determining the count of unused entries in the journal buffer includes at least the number of entries needed to record the host command to the journal buffer, recording the host command in the journal buffer; and decreasing the count of unused entries by the number of entries needed to record the host command to the journal buffer.

*     *     *     *     *